US008886985B2

(12) United States Patent
Somasundaram et al.

(10) Patent No.: US 8,886,985 B2
(45) Date of Patent: Nov. 11, 2014

(54) AUTOMATIC DISCOVERY OF PHYSICAL CONNECTIVITY BETWEEN POWER OUTLETS AND IT EQUIPMENT

(75) Inventors: Siva Somasundaram, Dayton, NJ (US); Allen Yang, Bridgewater, NJ (US)

(73) Assignee: Raritan Americas, Inc., Somerset, NJ (US)

( * ) Notice: Subject to any disclaimer, the term of this patent is extended or adjusted under 35 U.S.C. 154(b) by 882 days.

(21) Appl. No.: 12/168,504

(22) Filed: Jul. 7, 2008

(65) Prior Publication Data

US 2010/0005331 A1    Jan. 7, 2010

(51) Int. Cl.
 G06F 11/30   (2006.01)
 G06F 1/32    (2006.01)
 G06F 1/28    (2006.01)

(52) U.S. Cl.
 CPC .............. *G06F 1/28* (2013.01); *G06F 11/3093* (2013.01); *G06F 1/3203* (2013.01); *G06F 11/3051* (2013.01); *G06F 11/3062* (2013.01)
 USPC ........................................................ 713/340

(58) Field of Classification Search
 USPC ........................................................ 713/340
 See application file for complete search history.

(56) References Cited

U.S. PATENT DOCUMENTS

| | | | |
|---|---|---|---|
| 4,321,582 A | 3/1982 | Banghart | |
| 4,543,649 A | 9/1985 | Head et al. | |
| 4,955,821 A | 9/1990 | Bernardini | |
| 5,515,853 A | 5/1996 | Smith et al. | |
| 5,719,800 A | 2/1998 | Mittal et al. | |
| 5,964,879 A | 10/1999 | Dunstan et al. | |
| 6,167,330 A | 12/2000 | Linderman | |
| 6,229,899 B1 | 5/2001 | Norris et al. | |
| 6,413,104 B1 | 7/2002 | Bernardini | |
| 6,476,728 B1 | 11/2002 | Sakakibara | |
| 6,499,102 B1 | 12/2002 | Ewertz | |
| 6,553,336 B1 | 4/2003 | Johnson et al. | |
| 6,567,769 B2 | 5/2003 | Chang | |
| 6,697,300 B1 | 2/2004 | Holt | |
| 6,983,210 B2 | 1/2006 | Matsubayashi | |
| 6,985,697 B2 | 1/2006 | Smith | |
| 6,986,069 B2 | 1/2006 | Oehler et al. | |
| 7,032,119 B2 | 4/2006 | Fung | |
| 7,057,557 B2 | 6/2006 | Lee | |
| 7,248,978 B2 | 7/2007 | Ransom | |
| 7,272,735 B2 | 9/2007 | Fung | |
| 7,295,556 B2 | 11/2007 | Roese et al. | |

(Continued)

FOREIGN PATENT DOCUMENTS

| | | |
|---|---|---|
| EP | 0766098 | 4/1997 |
| EP | 1489719 | 12/2004 |

(Continued)

OTHER PUBLICATIONS

The International Search Report and Written Opinion by the International Searching Authority, issued on Sep. 8, 2008, in the PCT application No. PCT/US08/069422.

(Continued)

*Primary Examiner* — Nimesh G Patel

(57) ABSTRACT

The invention relates generally to the field of power management in data centers and more specifically to the automatic discovery and association of connectivity relationships between power outlets and IT equipment, and to methods of operating data centers having automatic connectivity discovery capabilities.

19 Claims, 10 Drawing Sheets

(56) References Cited

U.S. PATENT DOCUMENTS

| | | |
|---|---|---|
| 7,444,526 B2 | 10/2008 | Felter et al. |
| 7,802,120 B2 | 9/2010 | Conroy et al. |
| 7,853,816 B2 | 12/2010 | Tanaka |
| 2002/0007463 A1 | 1/2002 | Fung |
| 2002/0156600 A1 | 10/2002 | Chang |
| 2003/0124999 A1 | 7/2003 | Parssinen |
| 2003/0193777 A1 | 10/2003 | Friedrich |
| 2003/0204759 A1 | 10/2003 | Singh |
| 2004/0003303 A1 | 1/2004 | Oehler |
| 2004/0051397 A1 | 3/2004 | Juntunen |
| 2004/0064745 A1 | 4/2004 | Kadambi |
| 2004/0163001 A1 | 8/2004 | Bodas |
| 2004/0167732 A1* | 8/2004 | Spitaels et al. ............... 702/62 |
| 2004/0267897 A1* | 12/2004 | Hill et al. ............... 709/217 |
| 2005/0102539 A1 | 5/2005 | Hepner |
| 2005/0143865 A1 | 6/2005 | Gardner |
| 2005/0223090 A1 | 10/2005 | Ewing et al. |
| 2005/0283624 A1 | 12/2005 | Kumar |
| 2006/0005057 A1 | 1/2006 | Nalawadi |
| 2006/0013070 A1 | 1/2006 | Holm |
| 2006/0072271 A1 | 4/2006 | Jones et al. |
| 2006/0085854 A1* | 4/2006 | Agrawal et al. ............... 726/23 |
| 2006/0103504 A1 | 5/2006 | Vassallo |
| 2006/0112286 A1 | 5/2006 | Whalley |
| 2006/0168975 A1 | 8/2006 | Malone et al. |
| 2006/0171538 A1 | 8/2006 | Larson et al. |
| 2006/0184935 A1 | 8/2006 | Abels |
| 2006/0184936 A1 | 8/2006 | Abels |
| 2006/0184937 A1 | 8/2006 | Abels |
| 2006/0259621 A1 | 11/2006 | Ranganathan |
| 2006/0265192 A1* | 11/2006 | Turicchi, Jr. ............... 702/187 |
| 2006/0288241 A1 | 12/2006 | Felter |
| 2007/0010916 A1 | 1/2007 | Rodgers |
| 2007/0019626 A1 | 1/2007 | Lahiri |
| 2007/0038414 A1 | 2/2007 | Rasmussen |
| 2007/0040582 A1 | 2/2007 | Gross et al. |
| 2007/0078635 A1 | 4/2007 | Rasmussen |
| 2007/0136453 A1* | 6/2007 | Ewing et al. ............... 709/223 |
| 2007/0150215 A1* | 6/2007 | Spitaels et al. ............... 702/61 |
| 2007/0180117 A1 | 8/2007 | Matsumoto |
| 2007/0240006 A1 | 10/2007 | Fung |
| 2007/0245165 A1 | 10/2007 | Fung |
| 2007/0260897 A1 | 11/2007 | Cochran |
| 2007/0273208 A1 | 11/2007 | Menas |
| 2008/0052145 A1 | 2/2008 | Kaplan |
| 2008/0148075 A1 | 6/2008 | Reder |
| 2008/0170471 A1 | 7/2008 | Rolet et al. |
| 2008/0238404 A1 | 10/2008 | Ferguson |
| 2008/0244281 A1* | 10/2008 | Felter et al. ............... 713/300 |
| 2008/0270077 A1* | 10/2008 | Ozonat et al. ............... 702/186 |
| 2008/0317021 A1* | 12/2008 | Ives et al. ............... 370/389 |
| 2009/0207694 A1 | 8/2009 | Guigne |
| 2009/0234512 A1* | 9/2009 | Ewing et al. ............... 700/295 |
| 2009/0262604 A1 | 10/2009 | Funada |

FOREIGN PATENT DOCUMENTS

| | | |
|---|---|---|
| GB | 2423168 | 8/2006 |
| GB | 2437846 | 11/2007 |
| JP | 05-250188 | 9/1993 |
| JP | 6221649 | 8/1994 |
| JP | 2001337157 | 12/2001 |
| JP | 2003288236 | 10/2003 |
| JP | 2005069892 | 3/2005 |
| JP | 2005323438 | 4/2005 |
| JP | 2005198364 | 7/2005 |
| JP | 2006025474 | 1/2006 |
| JP | 2007139523 | 6/2007 |
| JP | 2007299624 | 11/2007 |
| WO | 2004074983 | 9/2004 |
| WO | 2006/089905 | 8/2006 |
| WO | 2006119248 | 11/2006 |
| WO | 2007072458 | 1/2007 |
| WO | 2007021392 | 2/2007 |
| WO | 2007024403 | 3/2007 |
| WO | 2010048205 | 4/2010 |

OTHER PUBLICATIONS

The International Search Report and Written Opinion by the International Searching Authority, issued on Aug. 7, 2008, in the PCT application No. PCT/US08/05533.

The International Search Report and Written Opinion by the International Searching Authority, issued on Nov. 25, 2009, in the PCT application No. PCT/US09/61521.

The International Search Report and Written Opinion by the International Searching Authority, issued on Apr. 21, 2009, in the PCT application No. PCT/US09/36299.

The International Search Report and Written Opinion by the International Searching Authority, issued on Dec. 18, 2009, in the PCT application No. PCT/US09/61354.

Office Action mailed on Nov. 3, 2010 in related U.S. Appl. No. 12/044,530.

The extended European Search Report by the European Patent Office, issued on Jan. 16, 2012, in the corresponding European patent application No. 09716608.6.

The extended European Search Report by the European Patent Office, issued on Aug. 2, 2012, in the related European patent application No. 09822648.3.

Office Action, mailed on Jun. 28, 2011, in related U.S. Appl. No. 12/044,530.

Office Actions, mailed on Jun. 16, 2011 and Feb. 23, 2012, in related U.S. Appl. No. 12/112,435.

Office Actions, mailed on Dec. 13, 2011 and Sep. 14, 2012, in related U.S. Appl. No. 12/603,322.

Moore et al., "Weatherman: Automated, online, and predictive thermal mapping and management for data centers," Jan. 1, 2006, Autonomic Computing, 2006. ICAC '06. IEEE International Conference on Dublin, Ireland Jun. 13-16, 2006.

Raghavendra et al., "No "Power" Struggles: Coordinated Multi-level Power Management for the Data Center," http://www.hpl.hp.com/echreports/2007/HPL-2007-194.pdf, Mar. 1, 2008.

Office Actions, mailed on Dec. 7, 2011 and Jun. 28, 2012, in related U.S. Appl. No. 12/582,480.

The English translation of the Chinese Office Action by the Chinese Intellectual Property Office, issued on Jan. 14, 2013, in the related Chinese patent application No. 200880131103.4.

Office Actions, mailed on Nov. 16, 2012 and Jul. 17, 2013, in related U.S. Appl. No. 12/112,435.

Office Actions, mailed on Dec. 10, 2012, in related U.S. Appl. No. 12/603,322.

Office Actions, mailed on May 24, 2013, in related U.S. Appl. No. 12/582,480.

Office Actions, mailed on Apr. 19, 2013, in related U.S. Appl. No. 13/790,601.

The Chinese Office Action, issued on Nov. 5, 2012, in the related Chinese Patent Application No. 200980142324.6.

The Chinese Office Action, issued on Apr. 26, 2013, in the related Chinese Patent Application No. 200980149075.3.

The English translation of the Japanese Office Action issued on Jun. 18, 2013 in the related Japanese application No. 2011-533304.

The Chinese Office Action, issued on Feb. 16, 2013, in the related Chinese Patent Application No. 200880129788.9.

Office Action, mailed on Aug. 20, 2013, in related U.S. Appl. No. 12/044,530.

Office Actions, mailed on Sep. 13, 2013 and Sep. 27, 2013, in related U.S. Appl. No. 12/582,480.

The Australian Office Action, issued on Mar. 22, 2013, in the related Australian Patent Application No. 2008359227.

The Chinese Office Action, issued on Dec. 18, 2013, in the related Chinese Patent Application No. 200880129788.9.

(56) References Cited

OTHER PUBLICATIONS

The Chinese Office Action, issued on Dec. 11, 2013, in the related Chinese application No. 200980142324.6.
The Japanese Office Action issued on Aug. 20, 2013 in the related Japanese application No. 2011-532336.
Office Action, mailed on Oct. 22, 2013, in related U.S. Appl. No. 12/044,530.
Office Action, mailed on Nov. 22, 2013, in related U.S. Appl. No. 12/112,435.
Office Actions, mailed on Jan. 10, 2014 and Mar. 18, 2014, in related U.S. Appl. No. 12/582,480.
Office Action, mailed on Nov. 7, 2013, in related U.S. Appl. No. 13/790,601.

* cited by examiner

AUTOMATIC DISCOVERY OF PHYSICAL CONNECTIVITY BETWEEN POWER OUTLETS AND IT EQUIPMENT

CROSS-REFERENCE TO RELATED APPLICATIONS

This application relates to U.S. patent application Ser. No. 12/112,435, entitled, "System and Method for Efficient Association of a Power Outlet and Device," filed on Apr. 30, 2008, now U.S. Pat. No. 8,713,342 issued on Apr. 29, 2014, and to U.S. patent application Ser. No. 12/044,530, entitled, "Environmentally Cognizant Power Management", filed on Mar. 7, 2008, now U.S. Pat. No. 8,671,294 on Mar. 11, 2014, both of which are assigned to the same assignee and which are incorporated herein by reference.

TECHNICAL FIELD

The invention relates generally to the field of power management in data centers and more specifically to the automatic discovery of connectivity relationships between power outlets and IT equipment, and to methods of operating data centers having automatic connectivity discovery capabilities.

BACKGROUND

Intelligent power distribution devices offer enhanced power distribution and monitoring capabilities for certain sensitive electrical and electronic applications. An exemplary application where deployment of intelligent power distribution devices proves useful is in the powering of multiple computer servers at predefined schedules based on power management policies that are involved in the provision of network services. Here, the ability to control and monitor power distribution is an invaluable tool for computer network operators and IT personnel, and for use in comprehensive power optimization.

One intelligent power device of the above-described type is the Dominion PX Intelligent Power Distribution Unit (IPDU), developed and sold by Raritan Corp. of Somerset, N.J. The Dominion PX IPDU offers increased operational and monitoring capabilities at each of the AC power outlets included in the device. Generally, these capabilities will include the ability to turn an outlet on and off, and also provide power consumption measurements for that outlet, among other features. It is desirable for the intelligent power device or equipment monitoring the intelligent power device to know what specific equipment is at the other end of a power cable plugged into each outlet of the intelligent power device.

Further, network administrators are often required to maintain the power connectivity topology of a data center. One method for maintaining a power connectivity topology is with a spreadsheet or in a centralized configuration database, which the network administrator updates from time to time. Other data center asset management systems are also available to track the physical power connectivity relationship relying on manual input of physical connections using bar code readers and serial numbers in the nameplate. Data, once inputted, can be presented to topology rendering engines, which can present topologies as reports or as topology maps for intuitive visualization. In large data centers, which can contain thousands of servers, manually maintaining the data center power topology is a tedious and error-prone task.

Nevertheless, the importance of maintaining accurate and up-to-date power topologies is increasing in the field of network administration and management. As the cost of computing decreases, the cost of power usage by the data center becomes a cost-driver. Reducing power consumption is, therefore, an object of concern for network administrators. Likewise, recent green initiatives have provided incentive to reduce power usage in the data center. Organizations, such as Green Grid, publish data center energy efficiency metrics. Data centers measure themselves against these metrics in evaluating efficiency. All of these data center management requirements benefit from a highly accurate data center power topology.

There are known certain automatic discovery topology tools for networks. These tools like ping, tracert, and mping, disclose logical connectivity maps for networks; however, they do not provide for automatic discovery of physical connectivity between IT equipment and power outlets. At present, the only way to determine what equipment is associated with specific outlets of a power distribution device is to have that information manually entered.

SUMMARY OF THE INVENTION

A system and method according to the principles of the invention automatically discovers a physical connectivity topology for information technology (IT) equipment in a data center. The topology displays the connection between IT equipment and power outlets. A system according to the principles of the invention applies a set of heuristics to identify candidate power outlets for individual servers or other IT equipment. In one aspect, for a particular piece of equipment, the candidate outlets are selected based upon physical proximity to the IT equipment. These candidates are iteratively narrowed based upon theoretical power consumption data, actual power consumption data, CPU utilization, and correlation of state change events.

Physical location can be determined using various technologies, such as ultrasound sensing or RFID. This information can then be used to augment the physical connectivity between the server and power outlets. In a typical situation, the power consumption data as provided by the IT equipment vendors can be used to narrow candidate outlets by systematically comparing the outlets that fall within the operating range provided by the vendor. This name plate data typically exceeds the actual power consumption and may not narrow the candidate outlets to a conclusive mapping. In these cases, actual data can further narrow the candidate outlets. CPU utilization data for the servers can be collected over a time interval and quantized to reduce noise and other artifacts. Actual power consumption over the same time period is collected from candidate power outlet using an appropriate IPDU. Pattern matching between quantized CPU utilization and power consumption graphs identifies matches. Further, state changes reflected in power and CPU utilization data further narrow the candidate power outlets for given IT equipment. Quantized CPU utilization and power consumption data can also be used for these comparisons. Where heuristics narrow the candidates, but do not converge, the administrator can view utilization graphs and other data outputs to make subjective conclusions as to the best outlet candidate for a piece of IT equipment.

A system and method for providing automatic identity association between an outlet of an intelligent power distribution unit and a target device, such as a computer server, which is powered by that outlet can include a power management unit or power distribution unit which implements data collection at the power outlet. The IT equipment's power requirement profiles prescribed by the equipment vendors as well as the actual usage patterns measured over time are correlated with power consumption patterns detected on the candidate power outlets. Further correlations are made between the time sequence of certain state changes on the IT equipment, such as server turn on and off, server computing work load changes and virtual machine migration. These state changes can be detected by a monitoring system and are reflected in actual power utilization changes on the power outlets. The heuristic rules and indicators are applied iteratively until the candidate number of power outlets matches the number of power supply units on the IT equipment.

The discovery of physical connectivity topology according to the principles of the invention maintains a high degree of integrity. In addition to key indicators such as actual CPU utilization and power consumption, other indicators characteristic of the particular functionality of given IT equipment can further identify candidate power outlets. Furthermore, interfaces can be used to permit administrators to verify the power matching by actual inspection of CPU utilization and power consumption usage graphs for the IT equipment and the discovered power outlet.

DETAILED DESCRIPTION OF THE DRAWINGS

Figure 1:
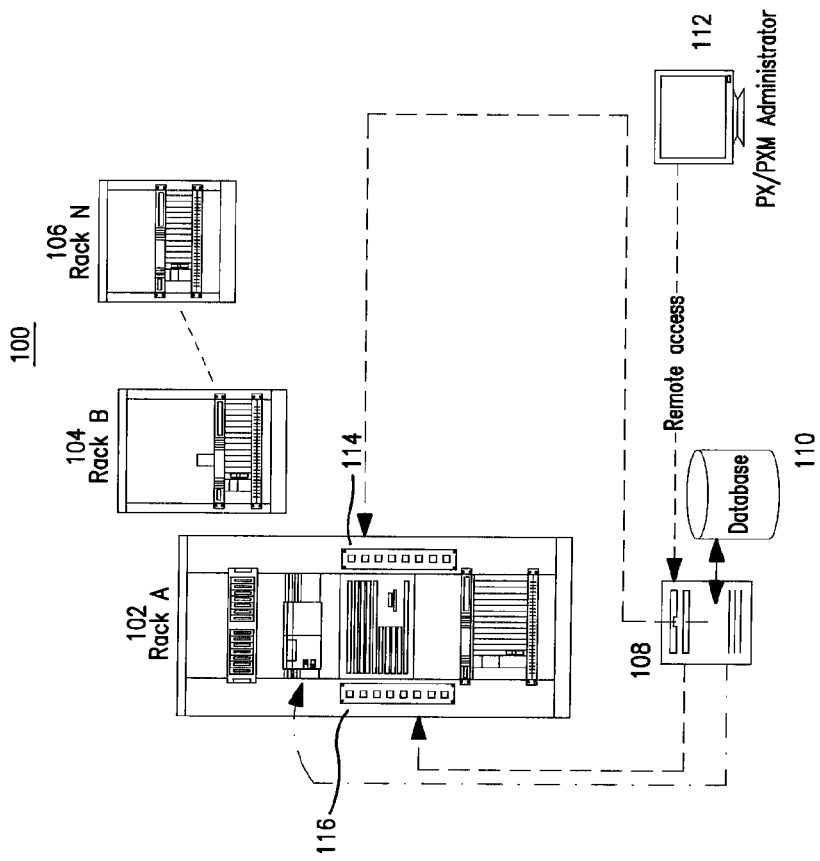
FIG. 1 illustrates a system according to the principles of the invention.

FIG. 1 discloses a system 100 according to the principles of invention. The system 100 includes N racks of IT equipment, of which three racks 102, 104, 106 are illustrated, of the ye that may be typically employed in a data center. These racks can hold any number of various types of IT equipment including servers, routers, and gateways. By way of example, rack 102 illustrates two vertically mounted power strips 114, 116, each of which include eight power receptacles, and to which the power supplies of the IT equipment are physically connected. Other racks in the data center have similar power outlet units, which can be mounted in a variety of configurations.

In this exemplary system 100, these power strips are of the type that can provide power consumption data and other functionality, such as the Dominion PX IPDU provided by Raritan Corp. of Somerset, N.J. Alternatively, these units can be referred to as power distribution units or PDUs. These power distribution units provide TCP/IP access to power consumption data and outlet level switching, and can provide alerts via SNMP and email for events like exceeded threshold or once on/off power cycling. PDUs integrate with a wide variety of KVM switch solutions, such as the Dominion KX2 and Paragon II KVM switches provided by Raritan Corp. Racks 104, 106 maybe similarly equipped. PDUs are often highly configurable, and these exemplary power distribution units 114, 116 interface directly with a Power Manager 108. Power Manager 108 maybe an element management system that can configure multiple IPDUs in the electrical power distribution network. The Power Manager can also collect the IT utilization information provided by the IPDU. The exemplary Power Manager 108 maybe equipped to provide remote access to the Administrator 112 and can address power distribution units 114, 116 through Internet Protocols. The Power Manager 108 can be configured to discover and aggregate data in Database 110 which provides data for the heuristics applied according to the principles of the invention. As will be explained below, this data includes actual power consumption data, IT equipment specifications, CPU utilization data, theoretical power consumption data, and state change events on the IT equipment.

Figure 2:
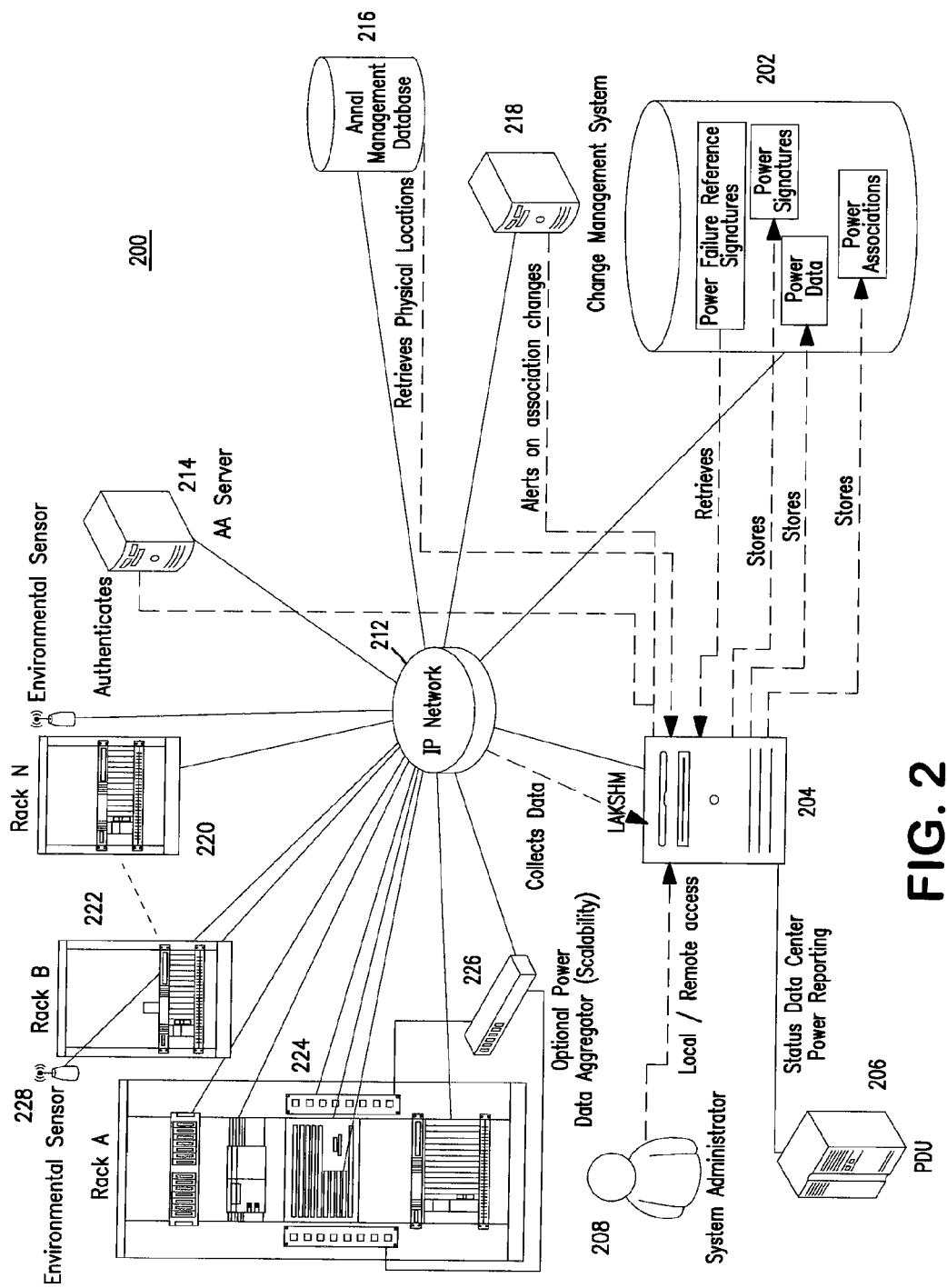
FIG. 2 shows another system according to the principles of the invention.

FIG. 2 illustrates another exemplary system 200 with a data center including N racks of IT equipment. Three racks 220, 222, 224 accessible to an Administrator 208 over an IP network 212 are disclosed for illustrative purposes. Rack 224 includes IT equipment as well as a power distribution unit having intelligent power capabilities. Among these capabilities are the gathering of data such as actual power consumption data at the output outlet level. Racks 220, 222 are similarly equipped, and further include an environmental sensor 228 operable to sense environmental conditions in the data center. An optional power data aggregator 226 interfaces with power distribution units and aggregates data from the outlets. These several racks 220, 222, 224 are further equipped with sensors and circuitry for determining physical proximity to power outlets. The sensors mounted in the racks can be monitored by the IPDUs to infer the amount of power dissipation in terms of temperature rise. The amount of temperature rise directly correlates to the amount of power consumption exercised by the server and thus can be used in the correlation. The system 200 includes an authentication sever 214 and a remote access switch 204, such as the Dominion KX KVM over IP switch which interfaces with the Administrator 208.

The switch 204 is further interconnected with a data store 202 for storing and retrieving data useful in determining the physical connectivity of IT equipment to power outlets. This data includes but is not limited to power failure reference signatures, theoretical power signatures, actual power signatures, actual power data and other associations. The power distribution manager 206 further interfaces with the KVM switch 204 providing the Administrator 208 with the ability to access from the remote location power distribution unit data from various power distribution units located on racks 220, 222, 224. Another database 216 is accessible over the IP network 212 to store physical location data as pertains to IT equipment and power outlets. A change alert server 218 is also optionally connected and accessible over the KVM switch 204. In operation, data from the racks and power distribution units in the data center is collected and stored over the IP network and selectively accessible to the Administrator 208. The power distribution center and reporting equipment access the data and implements the methods according to the invention to identify physical connectivity between IT equipment and power outlets. The KVM switch 204 can be used to actively connect to the server to be associated as this will increase utilization at the server. Administrators can use this KVM approach to improve the connectivity discovery on selected servers that may provide similar power signatures in regular operation.

In each of the above systems 100, 200, power distribution units and KVM switches and/or other administrator appliances or servers are programmed to collect data for storing in databases for later use and for applying correlation heuristics. The data acquired through the monitoring can be classified into two major categories. One is the time series information that provides the value of the data at any instant of the time. Secondly, the time stamped events that effect both the IT and power systems. Examples of the latter include the reboot of the sever machine and startup of the server. Among the different data attributes useful to a correlation method according to the principles of the invention are data related to the theoretical power usage requirements of particular IT equipment, the actual power consumption data at particular power outlets as measured over time, actual CPU utilization data for servers in the data center collected over time, and physical distance relationships between identified servers and identified power outlets. In addition to this data, other useful characterizing data can be obtained and stored in the data stores. This data could include data characteristics for a particular type of IT equipment found in the data center. For example, email servers, web servers, routers and the like often have identifiable characteristics depending upon their particular usage in the data center which include data related to temperature, CPU utilization, changes of state from on to off, any other characteristic that may be identifying either alone or in combination with other server characteristics.

A correlation engine can be implemented in either a power management unit, a general purpose computer, or a dedicated server accessible to the data stores to run any heuristics and to develop a connectivity map for the entire data center. As heuristics are applied, the number of outlets that can connect to a particular possible server are narrowed and in the general case converge to an identified outlet for the server. Where heuristics are applied but cannot reduce the possible candidates to a correspondence, the administrator may access graphical renderings of particular characteristics such as CPU utilization graphs, power consumption graphs, and the like to make a subjective assessment of the likelihood that a particular server is physically connected to a particular outlet. Databases and rendering engines can be implemented using known data structures and rendering software such that topographies of the data center's physical connectivity can be rendered.

Any particular heuristic is optional and additional heuristic rules and indicators can be added to a process for identifying a physical connectivity between a server and an outlet. In one exemplary method, a set of power outlets are identified as the probable candidates for a particular IT advice. These probable candidates can be based upon previously provided connectivity data, association clustering, physical location, or best guess candidates input by a data administrator. The additional information helps convergence by matching the likely set of unknowns as opposed to applying decisions to completely unknown sets of power and IT end points (pairs). With respect to these candidates, a set of heuristic rules are applied to attempt to map the IT equipment to a particular outlet or outlets. The heuristic process concludes when the number of candidate power outlets matches the number of power supply units on the IT equipment or when all heuristics are exhausted. In the case where all heuristics are exhausted, the administrator may make a subjective selection based upon viewing data of the remaining candidate outlets.

A number of indicators that can be used in the heuristic process include power usage name plate values, actual power consumption patterns, the time sequence of IT equipment state change events, and the physical location of the IT equipment in relation to the power outlets. So, for example, assuming a set of 20 candidate power outlets for a given piece of IT equipment, a subset are eliminated because they are not within a certain physical distance of the IT equipment. This indicator leverages the typical practice of locating servers within a specified maximum distance of its outlet. The name plate information is used to group the servers by their average power consumption levels and the pattern matching algorithm can match the selected subset of servers to determine the electrical power outlets only if the power values overlap. For example, if a power outlet has delivered M watts of power and the sever has the maximum name plate power as N watts and if $M \gg N$ then there is no correlation between the power outlet in question and the server. Of the remaining candidate outlets, a heuristic is applied to identify and correlate actual CPU utilization with actual power consumption at the power outlet. This reduces the number of candidate outlets to an identified set. If it does not, then an additional heuristic is applied to determine actual state changes as reflected in CPU utilization graphs and power consumption graphs. Additional heuristics could be applied by analyzing IT utilization over a day with a histogram. The time series data can be transformed into other domains in the frequency or spatial domain to improve the correlation within the context of power characteristics.

In one aspect of the invention, the first candidate of potential outlets for a particular server is identified through IP addressing. The number of IPUs in the electrical distribution can be discovered using different methods based on their capabilities. In the case of a Raritan DPX, the IPMI discovery will provide enough information about the presence and configuration of these units. Similarly the network management technologies provide capabilities to discover the server system details including the network IP address that can be used to monitor and measure the IT utilization over a network. Using the IP address, data is collected from servers and from power outlet units. The data is aggregated in the data store. The data collection methodologies available for the proposed invention include SNMP, IPMI, WMI and WS-MAN. All these standard management interfaces provide remote monitoring capabilities useful for this invention. The data is time-stamped so that power usage, CPU usage and events can be correlated between different candidate power outlets and different IT equipment.

Figures 3A, 3B, 3C:
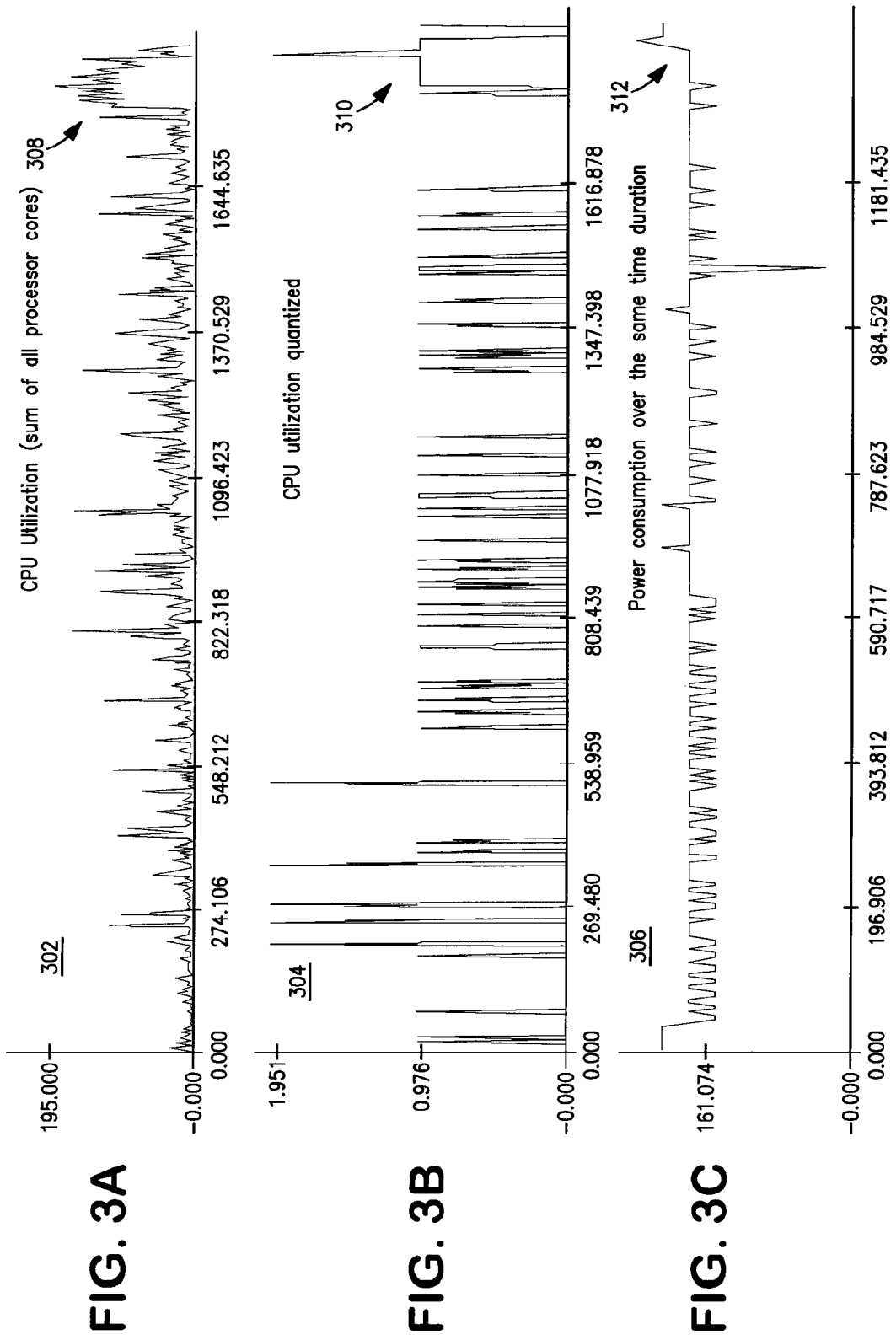
FIG. 3 shows exemplary graphs for implementing aspects of heuristic rules according to the principles of the invention.

FIGS. 3A, 3B and 3C show three exemplary graphs 302, 304, 306 demonstrating one aspect of the heuristics that can be applied according to the principles of the invention. The graph 302 of FIG. 3A shows CPU utilization (Y axis) over time (X axis). The CPU utilization data is raw, unquantized data, and represents all cores in the candidate IT equipment under consideration. The unquantized data is somewhat noisy, and may be suboptimal for correlating with other data. Graph 304 of FIG. 3B shows the same data as quantized to remove artifacts and noise. In this example, the usage values are approximately quantized to integer values 1 and 2, although other quantization methods can be employed without departing from the principles of the invention. Here again the usage data corresponds to all cores for the candidate IT equipment. FIG. 3C graph 306 shows the actual power consumption of the candidate outlet over the same time period with time tracked using time stamps applied during data collection. There is an event change demonstrating a change in CPU utilization, as shown by arrows 308 and 310. Likewise, in the power consumption graph 306, the data reveals a power spike at 312. This spike 312 potentially correlates with the events in core utilization 308, 310 for the unquantized and quantized graphs. Time stamp comparison of the events is another data indicator that can be used to correlate this candidate IT equipment to the candidate power outlet.

Figure 4:
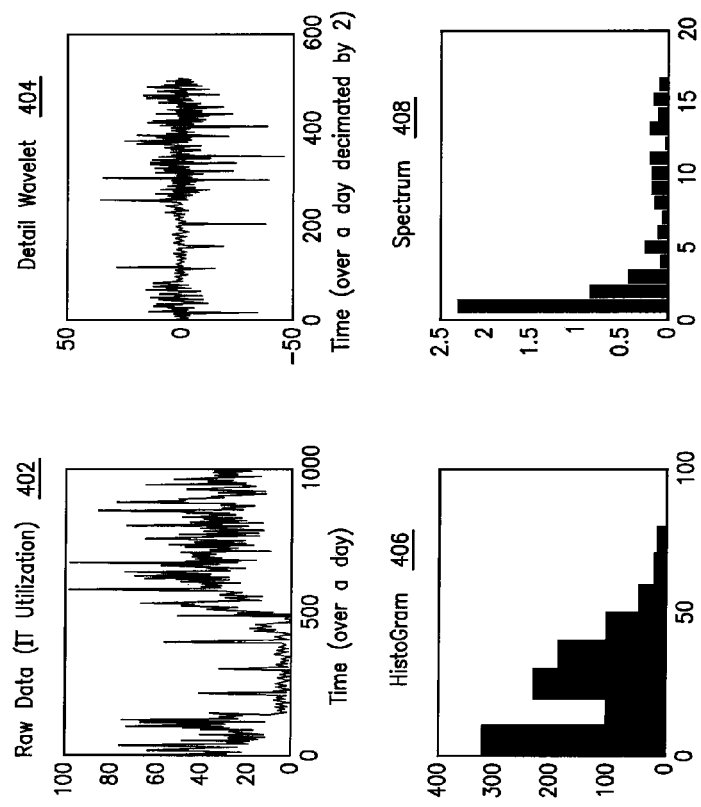
FIG. 4 shows other exemplary graphs for implementing aspects of heuristic rules according to the principles of the invention.

FIG. 4 shows exemplary utilization data graphs 402, 404 and corresponding histograms 406, 408 which can be used to correlate candidate power outlets to IT equipment in the heuristics according to the principles of the invention. Graph 402 represents raw utilization data for all cores of a piece of IT equipment over a whole day, where the utilization values fall from approximately zero to approximately 100. The raw utilization data is not easily mined for indicators that can be used to correlate to candidate power outlets. The utilization histogram 406 categorizes the utilization based upon the frequency of the utilization at particular selected values. The histogram, therefore, depicts how often the IT equipment was used at a particular level over a given period.

Graph 406 details how often the processor cores of given IT equipment switches to different utilizations levels. In this example, the graph 404 is obtained by decimating raw utilization data by two over a given period. Because the graph 404 shows changes to lower or higher utilization from a current utilization status, the graph is normalized around zero on the vertical axis. Histogram 408 is an analysis showing frequency of utilization change on the X axis versus frequency of usage on the Y axis. This data can be used in the correlation techniques of the invention by preparing similar graphical histograms and spectrums for candidate power outlets and then examining them using computer implemented power matching or manually if necessary.

Figure 5:
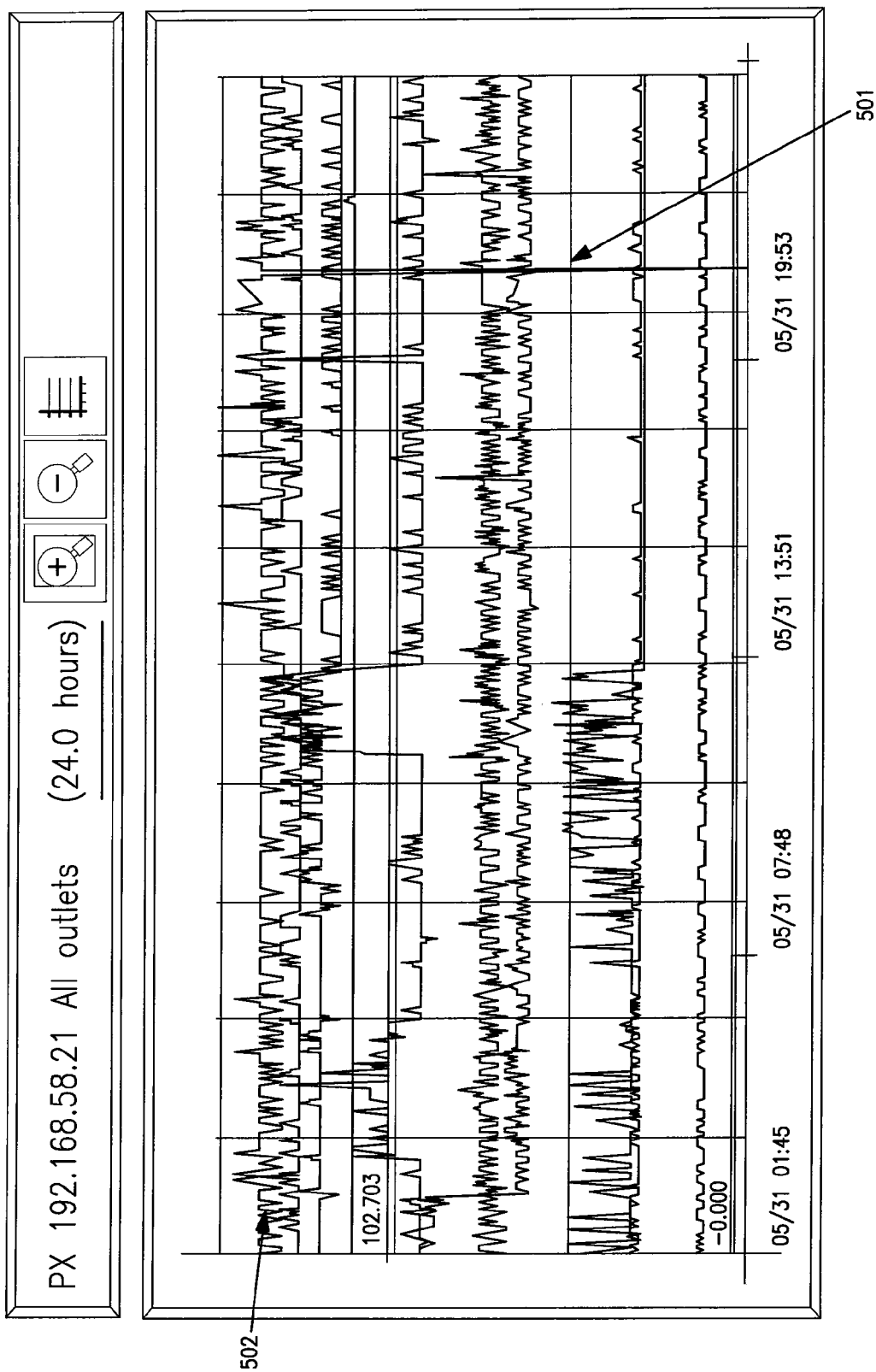
FIG. 5 shows an exemplary graph for a single intelligent power unit over a twenty-four hour period according to the principles of the invention.

FIG. 5 shows a power utilization graph of a single Dominion PX over a twenty-four hour period. Data 502 indicates the power utilization of one of the sockets reduced to zero at a particular time 501 that corresponds to the CPU utilization to be zero (or not available). If events like power recycle and shut down are not simultaneous present (as they are not in FIG. 5), then there is a low probability for achieving correlation based on events. Available PDUs are not currently equipped with an event logging feature for individual sockets in their PDUs. A PDU according to the principles of the invention extends such logging for the purposes of correlating events between servers and PDU sockets. Because the order of power recycle controls, the delay required to associate between the server and PDU are achievable.

Figure 6:
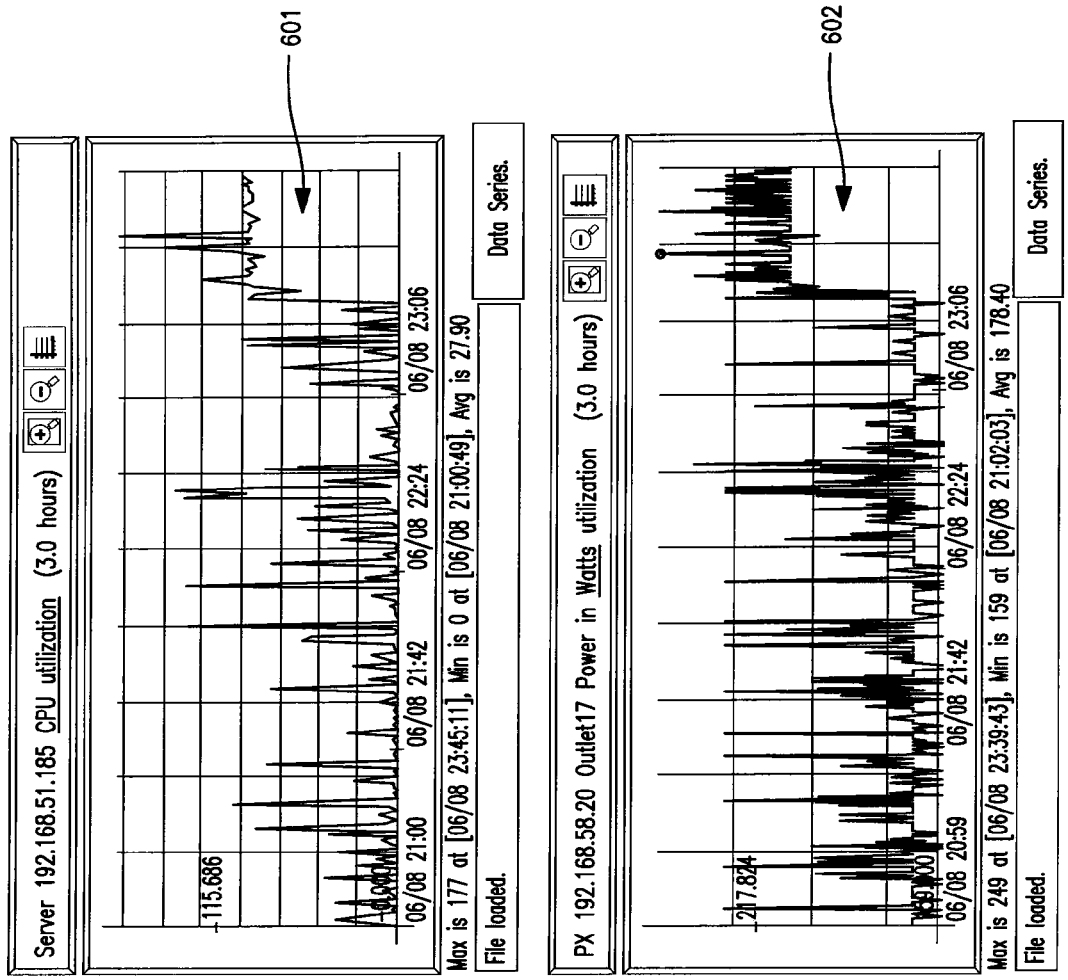
FIG. 6 shows an exemplary graph of CPU and power utilization for a single intelligent power unit over a three hour period according to the principles of the invention.

FIG. 6 shows an example of CPU and power utilization for a three-hour period. Data 601 represents the CPU utilization over the three-hour period. In this exemplary embodiment, the sum of all processor cores in a particular server includes all four cores in this processor, so the total value needs is divided by four to represent utilization as a percentage of power. Data 602 represents the power utilization for the server over the same period as logged by a PDU. As can be seen by data 601 and 602, both the CPU utilization and power steadily increase over time. As seen by data 602, the server consumes an average of 178 Watts for the average CPU utilization of 27.90 as indicated by data 601.

Figure 7:
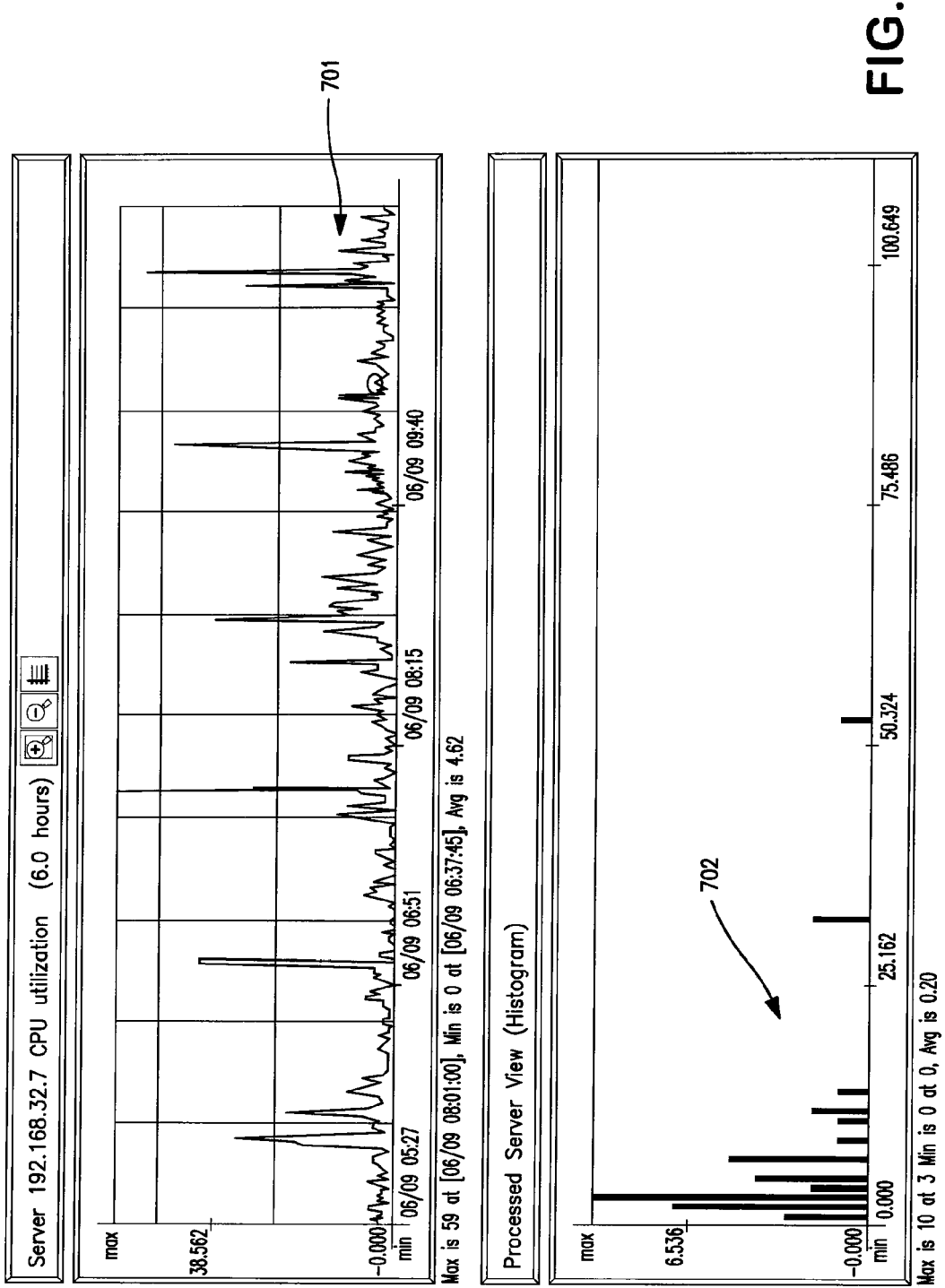
FIG. 7 shows an exemplary graph of CPU and processed view of the data for a single intelligent power unit over a three hour period according to the principles of the invention.

FIG. 7 shows an example of CPU utilization and a corresponding histogram of processed data, emphasizing the low utilization of the server. Data 701 shows the server activity and how active the server is over a given period of time. According to the principles of the current invention, and as can be seen from data 701, the transformation of the time series information from the server utilization or PDU can be useful when correlating based on data values. Data 702, is exemplary of the histogram based approach for converting the time series data 701 into a utilization context. Histogram data 702 may be correlated with a histogram of PDU utilization in accordance with the principles of the present invention.

Figure 8:
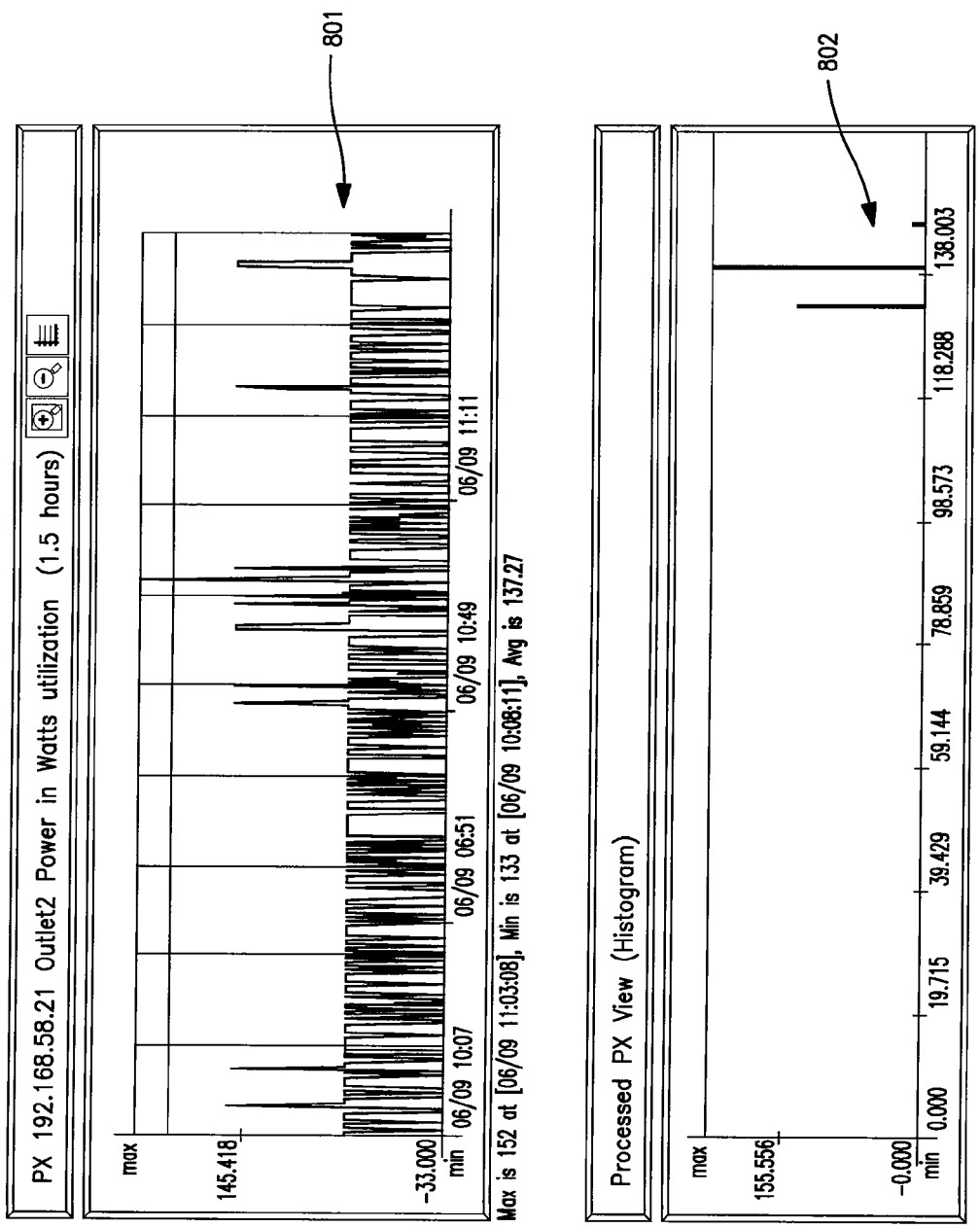
FIG. 8 shows an exemplary histogram translation of PDU utilization at the socket level according to the principles of the invention.

FIG. 8 shows exemplary PDU utilization of single outlet and the corresponding histogram view. Data 801 represents the power in watts of a given power outlet over a given period of time. As indicated the average power at the outlet is 137.27 watts. Data 802, represented by the histogram translation of PDU utilization at the socket level indicates that the majority of power activity at the socket level corresponds to the average consumed power over the same given period.

Figure 9:
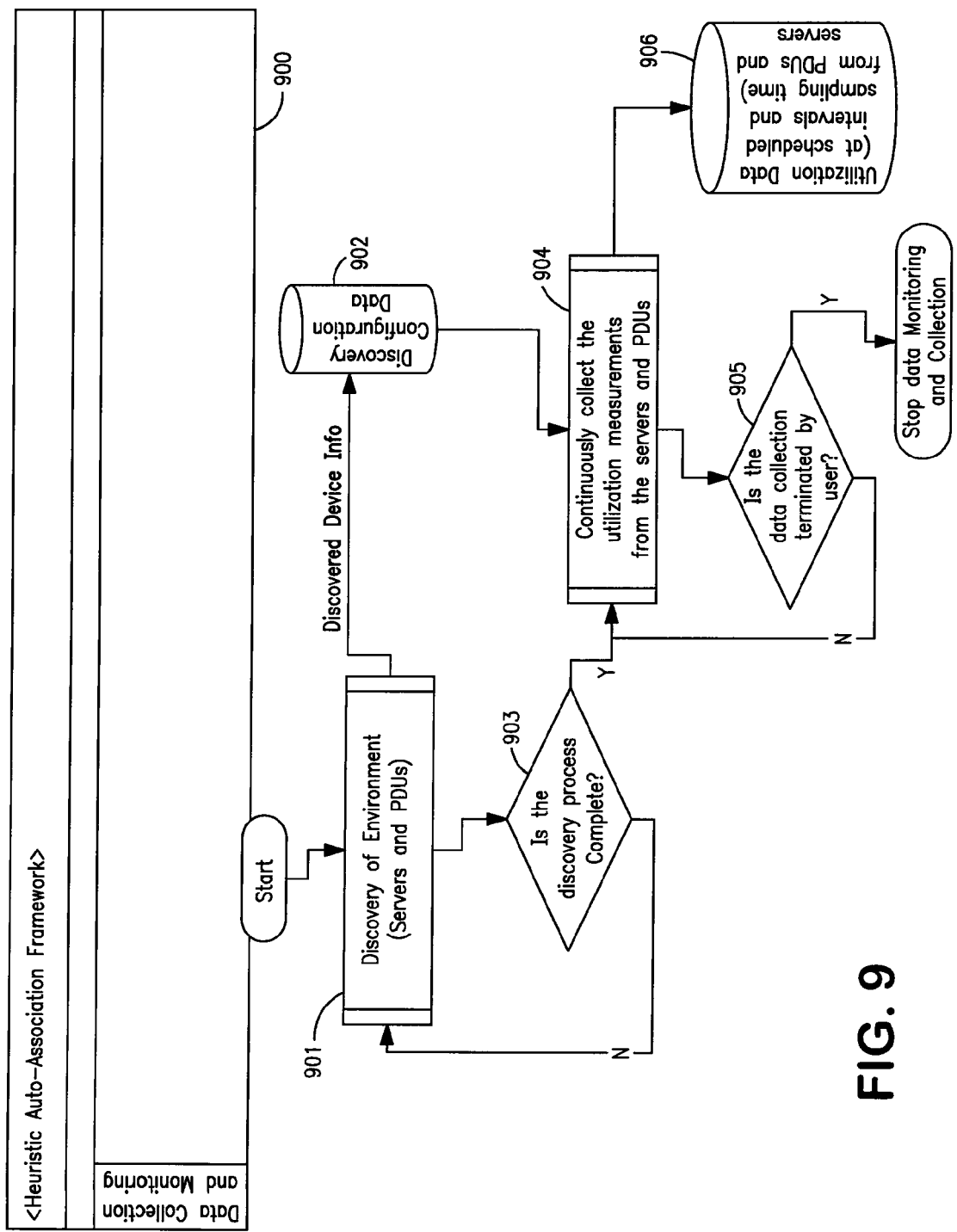
FIG. 9 shows an exemplary flow diagram of the auto association framework according to the principles of the invention.

FIG. 9 shows an exemplary flow diagram 900 of the heuristic auto-association framework in accordance with an embodiment of the present invention. Once started, step 901 retrieves environmental components of the system. Specifically, at step 901, the auto-association framework gathers configuration information regarding the servers and PDUs in the system and downloads that configuration information for storage in step 902. Step 903 determines if all configuration information has been collected. If there is additional configuration information to gather, steps 901 and 902 are repeated until the process is complete. During step 904, the utilization measurements from the identified servers and PDUs are collected and stored in a database at step 906. Steps 904 and 906 will be repeated until terminated by a user in step 905.

Figure 10:
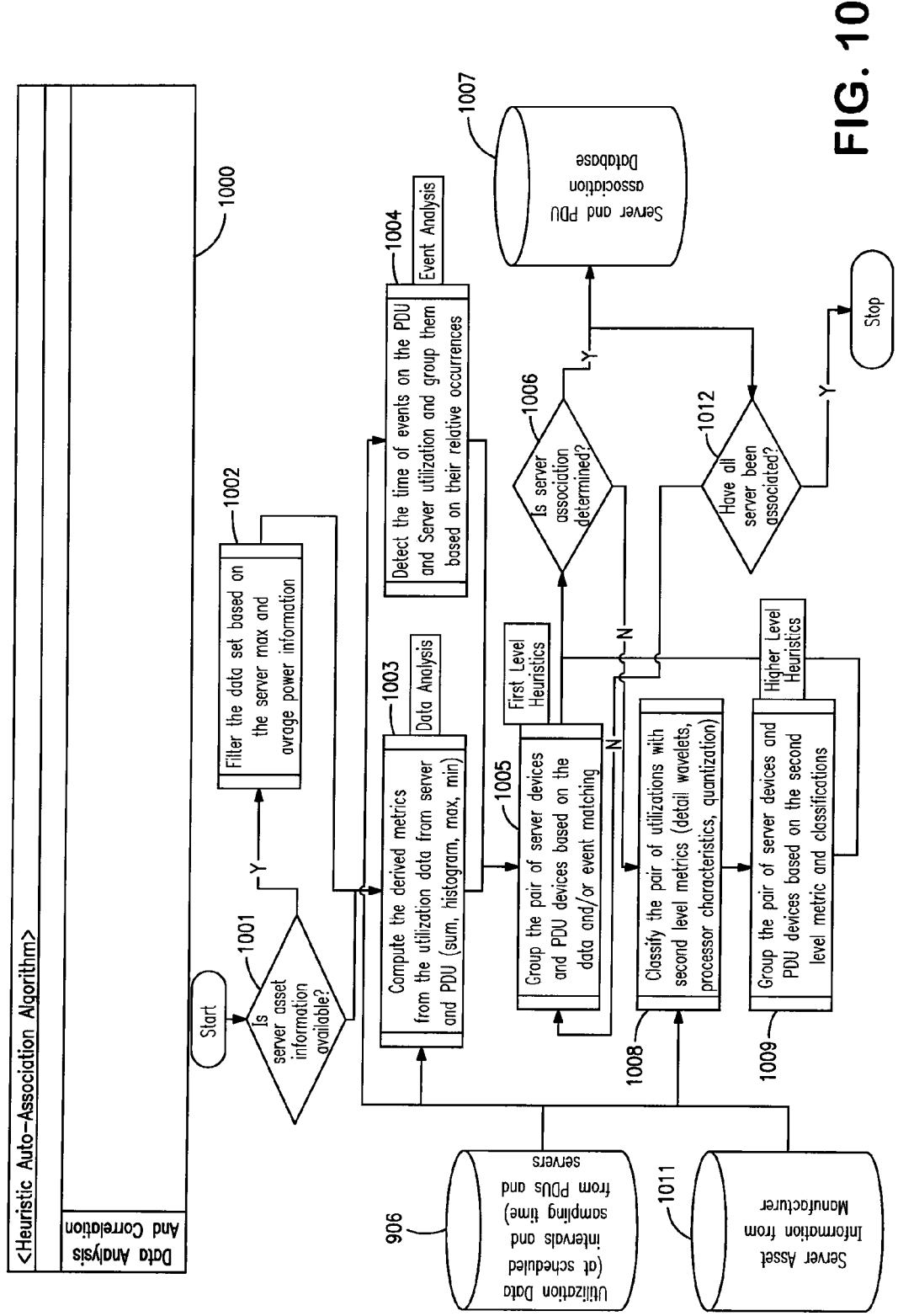
FIG. 10 shows an exemplary flow diagram of an auto association algorithm according to the principles of the invention.

FIG. 10 shows an exemplary flow diagram 1000 of a heuristic auto-association algorithm in accordance with the principles of the invention. In step 1001, the system determines if the server asset information is available for analysis. If the information is available, then the data is filtered at step 1002 based on the server maximum and average power information. The filtered information from step 1002 as well as the utilization data stored in the database of step 906 of FIG. 9. are passed along for analysis at step 1003. During step 1003, the derived metric from the utilization data from the server and PDU (i.e., sum, histogram, max., and min.), are computed. Similarly, at step 1004, an event analysis is performed to detect the timing of specific events on the various PDUs and servers and to group them based on relative occurrences. This may be based on server asset information from the various server manufacturers as supplied by database 1011 and input into step 1004 to further this analysis. The analyzed data from steps 1003 and 1004 are passed through a first level heuristics at step 1005. During step 1005, servers and PDUs are grouped into pairs based on the data and or event matching. During step 1006, it is determined if the pairings from step 1005 is a correct association between server and PDU. If it is determined to be correct, the information is passed on to a server and PDU association database and stored in step 1007. If the server PDU association of step 1005 is not determined as decided by step 1006, then the process moves to step 1008 to further classify the server PDU pair with a second level metric (i.e., detail wavelets, processor characteristics, quantization, etc.). Step 1009 performs higher-level heuristics and attempts to groups the servers and PDUs devices based on the second metric and classifications. If it is determined in step 1006 that the association is correct, then the server PDU association information is stored in the database at step 1007. Once it is determined that all servers have been associated with all PDUs, via step 1012 the algorithm exits.

These and other aspects of the invention can be implemented in existing power management topologies. Data acquisition capabilities for aggregating CPU utilization, actual power utilization, name plate specifications, and other data are currently known and in use. The data related to the assets can be acquired from the vendor list or can be imported from enterprise asset management tools. Basic data schemes may be used to aggregate the data including tables or hierarchical data structures. The heuristic process can be implemented on a general purpose computer or a separate functionality implemented within existing power management units. Rendering engines with front end interface capabilities for rendering graphs and/or interfaces are also known within the art.

What is claimed is:

1. A method for operating a discovery system in a data center having a plurality of servers powered via a plurality of power supply outlets, the method comprising of steps of:
    selecting a feasible set of candidate power supply outlets for at least one of the servers connected to at least one of the plurality power supply outlets, the feasible set being a subset of the plurality of power supply outlets;
    collecting power consumption data for the feasible power outlets over time and central processing unit utilization data for the at least one server during an overlapping time by a data collection module of the discovery system;
    storing the information collected by a data collection module of the discovery system;
    correlating the CPU utilization data to the power consumption data for candidate pairings of feasible power supply outlets with the at least one server by a correlation engine of the discovery system according to a first set of metrics;
    determining whether correlations according to the first set of metrics indicate that the at least one server is associated with one or more of the set of feasible power supply outlets; and
    correlating the CPU utilization data to the power consumption data by the correlation engine according to a second set of metrics when the correlation according to the first set of metrics is insufficient to determine an association.

2. The method of claim 1 wherein the step of selecting the feasible set of power supply outlets includes the substep of selecting power supply outlets that are located within a specified distance from the at least one server.

3. The method of claim 1 further comprising the step of correlating the power consumption data to theoretical power consumption data for the at least one server by the correlation engine of the discovery system.

4. The method of claim 1 wherein the collecting step includes the substep of specifying an IP address for the at least one server.

5. The method of claim 1 wherein at least one of the correlating steps includes the substep of quantizing the CPU utilization data.

6. The method of claim 1 wherein at least one of the correlating steps includes the substep of time-stamping the power consumption data and the CPU utilization data.

7. The method of claim 1 wherein at least one of the correlating steps includes the substep of correlating state changes between the CPU utilization data and the power consumption data.

8. The method of claim 1 further comprising the step of correlating the power consumption data to theoretical power consumption data for the at least one server in the correlation engine of the discovery system,
    wherein the step of selecting the feasible set of power supply outlets step includes the substep of selecting power supply outlets that are located within a distance from the at least one server,
    wherein the collecting step includes the substep of specifying an IP address for the at least one server and
    wherein at least one of the correlating steps includes the substeps of
    quantizing the CPU utilization data,
    time-stamping the power consumption data and the CPU utilization data, and
    correlating state changes between the quantized CPU utilization data and the power consumption data.

9. The method according to claim 1, wherein the second set of metrics includes metrics selected from the group consisting of CPU utilization level histograms, CPU utilization wavelets, and processor type.

10. The method according to claim 1 wherein the first set of metrics includes quantized CPU utilization data.

11. The method of claim 1 wherein the step of selecting the feasible, set of power supply outlets includes the substeps of:
    determining a historical average power delivery by each of the plurality of power supply outlets,
    determining a name plate power consumption by the at least one server, and
    selecting power supply outlets having a historical average power delivery that is less than the name plate power consumption for the at least one server.

12. A system for automatically discovering the connectivity of servers to a plurality of power outlets in a data center comprising:
    a data collection module interfaced with power supply outlets and IT equipment, the data collection module operable to collect actual power usage for power supply outlets and CPU usage from IT equipment;
    a data store having the information collected by the data collection module; and
    a correlation engine operable select a feasible set of candidate power supply outlets and correlate the CPU usage data with actual power usage data to identify a piece of IT equipment connected to one of the power supply outlets, the feasible set of power supply outlets being a subset of the plurality of power supply outlets,
    wherein the correlation engine determines whether correlations according to a first set of metrics indicate that the at least one server is associated with one or more of the set of feasible power supply outlets, and in addition determines correlations according to a second set of metrics when the correlations according to the first set of metrics are insufficient to determine an association.

13. The system according to claim 12, wherein the second set of metrics includes metrics selected from the group consisting of CPU utilization level histograms, CPU utilization wavelets, and processor type.

14. The method according to claim 12 wherein the first set of metrics includes quantized CPU utilization data.

15. A method for monitoring racks of IT equipment by a discovery system, comprising the steps of:
    aggregating CPU usage data for the IT equipment in a database of the discovery system;
    selecting a feasible set of candidate power supply outlets for an IT server located in the rack of IT equipment, the feasible set being a subset of a plurality of power supply outlets;
    correlating CPU usage for the IT server with actual power usage of a candidate power strip by a correlation engine of the discovery system according to a first set of metrics, wherein the correlating steps include the substep of identifying state changes for the IT equipment;

determining whether the correlations according to the first set of metrics indicate that the IT server is associated with one of the set of feasible power supply outlets, and correlating the CPU utilization data to the power consumption data by the correlation engine according to a second set of metrics when the correlation according to the first set of metrics is insufficient to determine an association.

16. The method according to claim 15, wherein the second set of metrics includes metrics selected from the group consisting of CPU utilization level histograms, CPU utilization wavelets, and processor type.

17. The method according to claim 15 wherein the first set of metrics includes quantized CPU utilization data.

18. The method of claim 15 wherein the step of selecting the feasible, set of power supply outlets includes the substeps of:

determining a historical average power delivery by each of the plurality of power supply outlets, determining a name plate power consumption by the IT server, and selecting power supply outlets having a historical average power delivery that is less than the name plate power consumption for the at least one server.

19. The method of claim 15 wherein the step of selecting the feasible set of power supply outlets includes the substep of selecting power supply outlets that are located within a specified distance from the IT server.

\* \* \* \* \*